US010551994B2

(12) United States Patent
Alfano et al.

(10) Patent No.: US 10,551,994 B2
(45) Date of Patent: Feb. 4, 2020

(54) PROBABILITY OF COLLISION BOUNDING SURFACES

(71) Applicant: Analytical Graphics Inc., Exton, PA (US)

(72) Inventors: Salvatore Alfano, Monument, CO (US); Daniel Oltrogge, Colorado Springs, CO (US)

(73) Assignee: Analytical Graphics Inc., Exton, PA (US)

( * ) Notice: Subject to any disclaimer, the term of this patent is extended or adjusted under 35 U.S.C. 154(b) by 0 days.

(21) Appl. No.: 16/056,704

(22) Filed: Aug. 7, 2018

(65) Prior Publication Data

US 2019/0050136 A1    Feb. 14, 2019

Related U.S. Application Data

(60) Provisional application No. 62/543,004, filed on Aug. 9, 2017.

(51) Int. Cl.
| | | |
|---|---|---|
| *G06F 3/0481* | (2013.01) | |
| *B64G 1/24* | (2006.01) | |
| *G01S 13/93* | (2006.01) | |
| G08G 5/04 | (2006.01) | |
| G05D 1/10 | (2006.01) | |
| G06F 17/13 | (2006.01) | |

(52) U.S. Cl.
CPC ......... *G06F 3/04815* (2013.01); *B64G 1/242* (2013.01); *G01S 13/9303* (2013.01); *G05D 1/101* (2013.01); *G06F 17/13* (2013.01); *G08G 5/045* (2013.01)

(58) Field of Classification Search
None
See application file for complete search history.

(56) References Cited

U.S. PATENT DOCUMENTS

2015/0339924 A1* 11/2015 Cook .................. G08G 1/14
                                                                 382/104
2015/0371429 A1* 12/2015 Spicer ................. G06T 11/001
                                                                 345/420

OTHER PUBLICATIONS

S. Alfano, "Eliminating Assumptions Regarding Satellite Conjunction Analysis", Journal of Astronaut Sciences, (2012) 59, pp. 676-705, American Astronautical Society 2014, Published online: Aug. 6, 2014.

(Continued)

*Primary Examiner* — Yi Wang
(74) *Attorney, Agent, or Firm* — The Marbury Law Group, PLLC

(57) ABSTRACT

Systems, methods, devices, and non-transitory media of the various embodiments provide for a three dimensional tool for depicting the variability of probability of collision ($P_c$) inputs to $P_c$ estimates. The depictions generated by the various embodiments may be used to quantify the quality of $P_c$ input data required to yield actionable $P_c$ estimates. Various embodiments may provide tools for depicting $P_c$ validation results. Various embodiments may provide a GUI for a computing device that may depict $P_c$ validation results.

3 Claims, 15 Drawing Sheets

(56) References Cited

OTHER PUBLICATIONS

P.C. Mahalanobis "On the Generalized Distance in Statistics", Proceedings of the National Institute of Sciences of India, vol. 2, 1936, pp. 49-55. retrieved from "http://www.google.com/url?sa=t&source=web&cd=1&ved=0CBQQFjAA&url=http%3A%2F%2Fwww.new.dli.ernet.in%2Frawdataupload%2Fupload%2Finsa%2FINSA_1%2F20006193_49.pdf&ei=I6GLTZxuiYTRAcq8sfMN&usg=AFQjCNG0tV_oCsXVIOXxKOW4S-rF-w9wdA".

S. Alfano et al. "On Selecting Satellite Conjunction Filter Parameters" Acta Astronautica, vol. 99, Jun.-Jul. 2014, DOI: 10.1016/j.actaastro.2014.02.004, 17 pages.

S. Alfano, "Relating Position Uncertainty to Maximum Conjunction Probability", The Journal of the Astronautical Sciences, vol. 53, No. 2, Apr.-Jun. 2005, pp. 193-205.

S. Alfano, "Review of Conjunction Probability Methods for Short-term Encounters", Center for Space Standards and Inovation, Colorado Springs, Colorado, 80132, American Institute of Aeronautics and Astronautics, 44 pages, Publication Date: Feb. 2007.

\* cited by examiner

PROBABILITY OF COLLISION BOUNDING SURFACES

CROSS REFERENCE TO RELATED APPLICATIONS

This application claims the benefit of priority to U.S. Provisional Application No. 62/543,004 filed Aug. 9, 2017, entitled "Probability of Collision Bounding Surfaces," the entire contents of which are hereby incorporated by reference.

BACKGROUND

Satellite and space vehicle operators continually face the risk of conjunctions (e.g., collisions) between objects in space and their satellites and space vehicles. The potential for damage to satellites and space vehicles drives the need to identify conjunction threats and maneuver the satellites and space vehicles accordingly to mitigate the risk of conjunctions.

Even when a risk of conjunction is identified, many satellite and space vehicle operators are uncertain of the level of risk posed by the conjunction and whether the risk is such that an at-risk satellite and/or space vehicle should be maneuvered. Probability of collision ($P_c$) is a tool that operators could use to assess conjunction threats, but many satellite and space vehicle operators don't fully understand $P_c$ including not understanding how $P_c$ is estimated, what variables can be used to estimate $P_c$, how $P_c$ is sensitive to changes in those variables, and how trends in $P_c$ can be used to make maneuver selections. As such, tools for depicting $P_c$ are needed to reduce the risk of conjunctions for satellites and space vehicles and to improve the maneuver planning and execution for satellites and space vehicles.

SUMMARY

The systems, methods, devices, and non-transitory media of the various embodiments provide for a three dimensional tool for depicting the variability of probability of collision ($P_c$) inputs to $P_c$ estimates. The depictions generated by the various embodiments may be used to quantify the quality of P input data required to yield actionable $P_c$ estimates. Various embodiments may provide a graphical user interface (GUI) for a computing device that may display a three dimensional depiction of the variability of $P_c$ inputs to $P_c$ estimates. Various embodiments may provide tools for depicting $P_c$ validation results. Various embodiments may provide a GUI for a computing device that may depict $P_c$ validation results.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
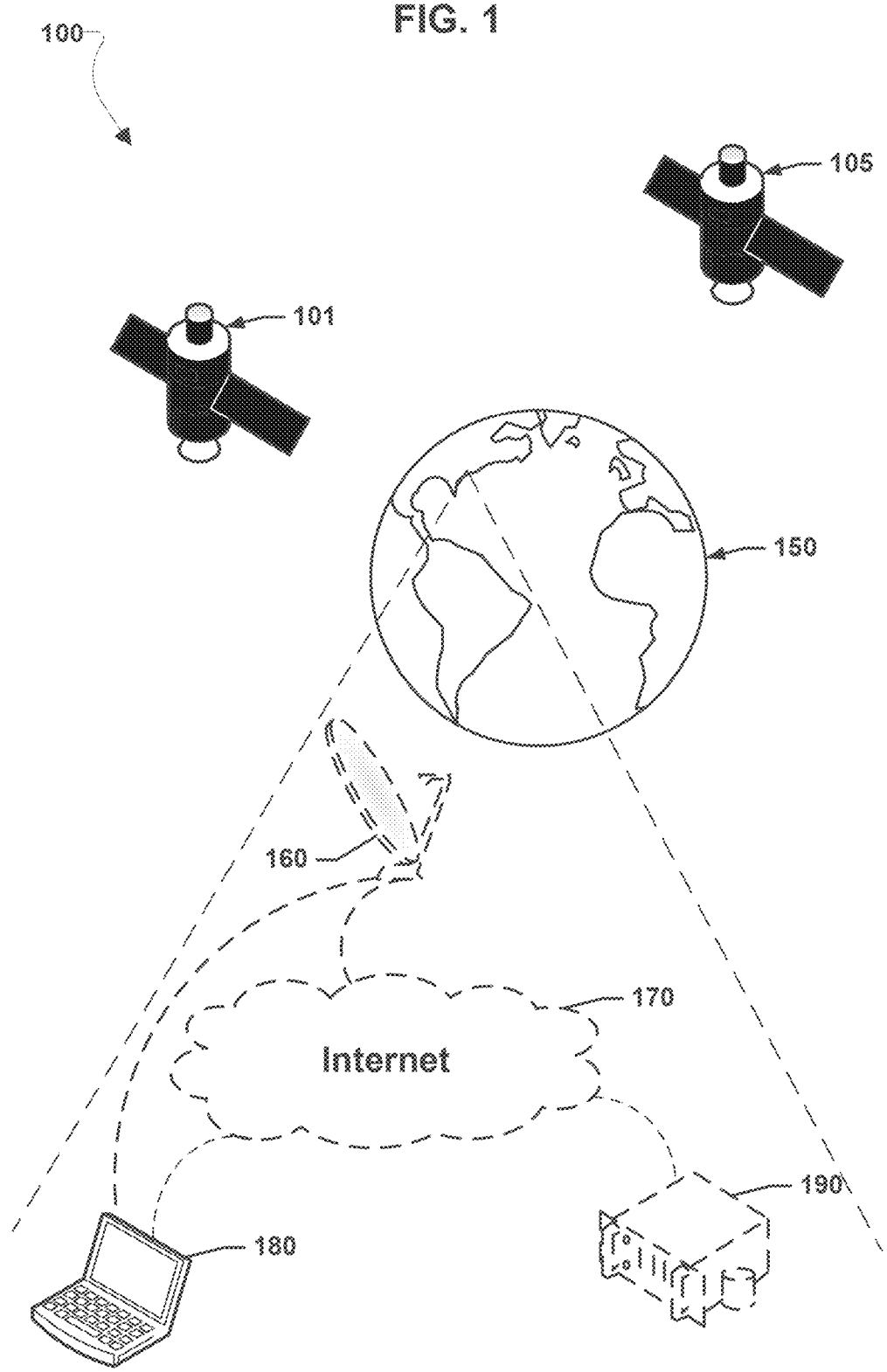
FIG. 1 is a component block diagram of a satellite tracking system suitable for use in the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The term "computing device" as used herein refers to any one or all of cellular telephones, smartphones, personal or mobile multi-media players, personal data assistants (PDA's), laptop computers, personal computers, servers, tablet computers, smartbooks, ultrabooks, palm-top computers, multimedia Internet enabled cellular telephones, and similar electronic devices that include a memory and a programmable processor. While specific examples are listed above, the various embodiments are generally useful in any electronic device that includes a processor and executes application programs.

Probability of collision ($P_c$) may be used as a tool to assess conjunction threats. Unlike other singular methods for assessing conjunction threats, such as Cartesian distance, Mahalanobis distance, maximum probability, or ellipsoids-touching tests, $P_c$-based methods and action thresholds may be preferable because $P_c$ incorporates miss distance, covariance size and orientation and the sizes of the conjuncting objects in a mathematically rigorous fashion.

Various embodiments provide $P_c$ estimation techniques and visualization user interfaces. Various embodiments provide three-dimensional, interactive tools for depicting the variability of the $P_c$ inputs (miss distance, covariance size, and object size) to $P_c$ estimates. Various embodiments may enable the integration of Mahalanobis space (i.e. Sigma space) and $P_c$ to be presented to a user and used to derive bounding values for Type I (false alarm) and Type II (missed alarm) errors for prescribed screening thresholds.

Various embodiments provide three-dimensional, interactive visualizations and determined bounds of false and missed alarms for prescribed screening metrics. Various embodiments enable the depiction of inter-variability (such as smaller object size coupled with larger covariance). The various embodiment displays may provide useful information regarding miss distance, covariance size, and object size in to a single visualization. In various embodiments, the user may be enabled to zoom in and out, reorient, change the $P_c$ threshold plane and limits of variability, as well as background color. Various embodiments may provide tools for depicting $P_c$ validation results. Various embodiments may provide a graphical user interface (GUI) for a computing device that may depict $P_c$ validation results. The various embodiment GUI displays may provide useful information regarding miss distance, covariance size, and object size in to a single visualization. In various embodiments, the user may be enabled to zoom in and out, reorient, change the $P_c$ threshold plane and limits of variability, as well as background color. Various embodiments may provide GUIs for satellite tracking systems to display depictions of $P_c$ validation results to satellite and space vehicle operators.

The various embodiments provide a tool that may rapidly and easily show the variability of the inputs to computing collision probability. The various embodiments may show the evolution of a specific conjuncting pair over time. The various embodiments may also show historical trends for an orbit regime, a specific satellite, or a specific sensor used for the orbital computation. The various embodiments may show the 'goodness' of the probability calculation by relating it visually to the maximum probability. The various embodiments may be extremely useful in assessing a conjunction. The visual nature of the various embodiments, may enable rapid assessment.

The various embodiments may relate false and missed alarms threshold to their respective error bounds. This may provide for setting/analyzing screening thresholds and may enable an answer to the question "How far out should I start looking/worrying?"

The various embodiments may explore $P_c$ sensitivities to input errors and derive required input data qualities necessary to yield actionable, decision-quality $P_c$ metrics in the collision avoidance maneuver process.

In various embodiments, collision probability metrics may be compared on an equal footing with other failure scenario probabilities, such as the probability that a thruster would "stick open."

FIG. 1 illustrates an embodiment satellite tracking system 100 including a first satellite 101 and a second satellite 105, in orbit around the Earth 150. While illustrated with only two satellites 105 and 106, the system 100 may track more than two satellites or other space based objects. The system may also include a communication network 170, such as the Internet, allowing a computing device 180 to communicate with a server 190 and tracking station 160. The computing device 180 may receive inputs from the server 190 and/or tracking station 160 to determine information associated with the orbits of the satellites 105 and 106. The computing device 180 may perform operations of various embodiments to output and display a three dimensional tool (e.g., a graphical user interface) for depicting the variability of $P_c$ inputs to $P_c$ estimates. The depictions generated by the various embodiments may be output in various three dimensional tools (e.g., a graphical user interface (GUI)) to quantify the quality of $P_c$ input data required to yield actionable $P_c$ estimates.

En masse adoption of $P_c$ by operators is ill-advised without first having a firm grasp of the input data accuracies required to meet desired $P_c$ accuracies. Employing $P_c$ as one's collision avoidance maneuver decision criteria would not make sense if the inputs were so erroneous that the resulting $P_c$ estimates are not of decision quality. Various embodiments leverage $P_c$ sensitivities to input errors and then derive required input data qualities necessary to yield actionable, decision-quality $P_c$ metrics in the collision avoidance maneuver process. Various types of $P_c$ estimation techniques are provided, such as (1) short ("linear") contrasted with low-velocity "non-linear" encounters, (2) non-spherical object collision probability and (3) maximum probability. The inputs to these techniques that may be required include: (1) object size/shape/orientation; (2) uncertainty size/shape/orientation; and (3) nominal miss distance geometry and magnitude. In the context of the $P_c$ estimation techniques and their resulting topographies, the sensitivity of $P_c$ estimates to errors in each of the input types may be examined. To better understand how these parameters affect the calculation, three-dimensional tools that depict the variability of $P_c$ estimates to variability in $P_c$ input parameters may be provided by the various embodiments. These depictions are then used to quantify $P_c$ input data quality required to yield actionable $P_c$ estimates. This promotes informed decisions by displaying all possibilities for a given collision scenario, leaving the analyst to determine the bounds of reasonableness to apply to the resulting $P_c$ topography.

Variations in any of the input parameters affect the $P_c$ estimate. The accuracy of positional covariance resulting from orbit determination and subsequent propagation is often questionable. Sizes of objects is typically handled by simplistically modeling the objects as spheres by circumscribing their largest dimension, resulting in an overestimation of probability. Miss distance itself can vary dramatically due to force mismodeling, inclusion of additional observations and the presence of unknown maneuvers. Next, $P_c$ sensitivities are "inverted" to determine the accuracies required of each of the $P_c$ inputs in order to produce resulting $P_c$ estimates that are accurate to within a specified percentage of the median value. This inversion yields a multidimensional boundary (sheet) governing input accuracy. As a worst-case allowable error, one can simply set all other error components to zero for a conjunction of interest in order to determine what the worst-case error of any one component is allowed to be. The resulting worst case errors thus obtained may then be compared to estimated errors in each input component, allowing conclusions to be made regarding: (a) how accurate the orbit solution nominal trajectory and position along that trajectory needs to be as a function of time; (b) how accurate the nominal trajectory is at OD epoch and how that accuracy degrades with time (covariance and its propagation and scaling); (c) how accurately the object size, shape and orientation must be known.

The worth of a $P_c$ measurement is only as good as the inputs and assumptions that produce it. For short-term encounters the simplifying assumptions are well defined and summarized as follows: 1) The relative motion of the conjuncting objects is fast enough to be considered linear; 2) the positional errors are zero-mean, Gaussian, and uncorrelated; 3) the covariance (and its derived size, shape and orientation) is assumed constant due to the relatively short encounter period; and 4) the objects themselves are modeled as spheres.

There are a wide variety of $P_c$ assessment methods, and in the following discussion of the various embodiments, spherical conjuncting objects and high-velocity encounters are assumed as examples. For more challenging conditions, more detailed $P_c$ assessment methods may be substituted for the examples discussed herein, such as non-linear conjunctions and non-spherical hardbody shapes.

Figure 2:
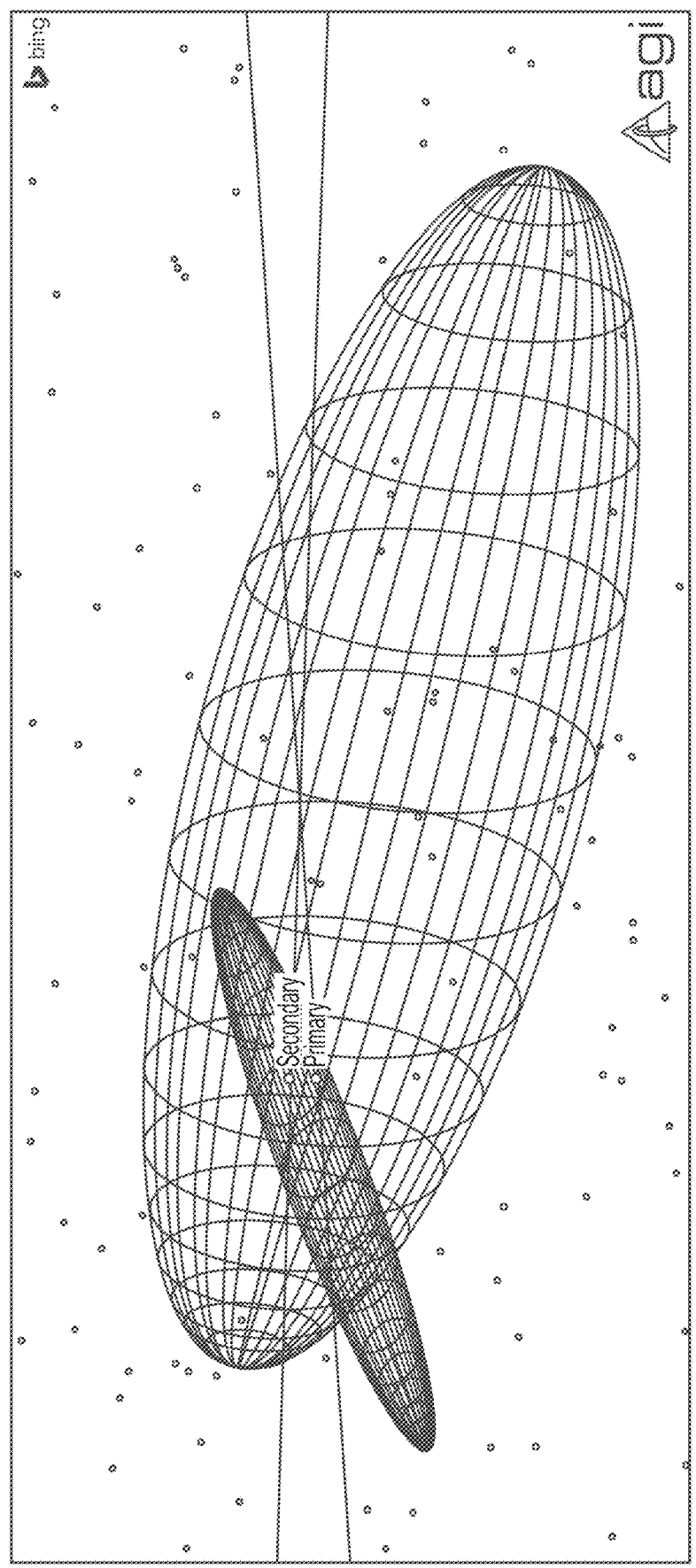
FIG. 2 is an illustration of a conjunction encounter depicting position covariance ellipsoids.
Figure 3:
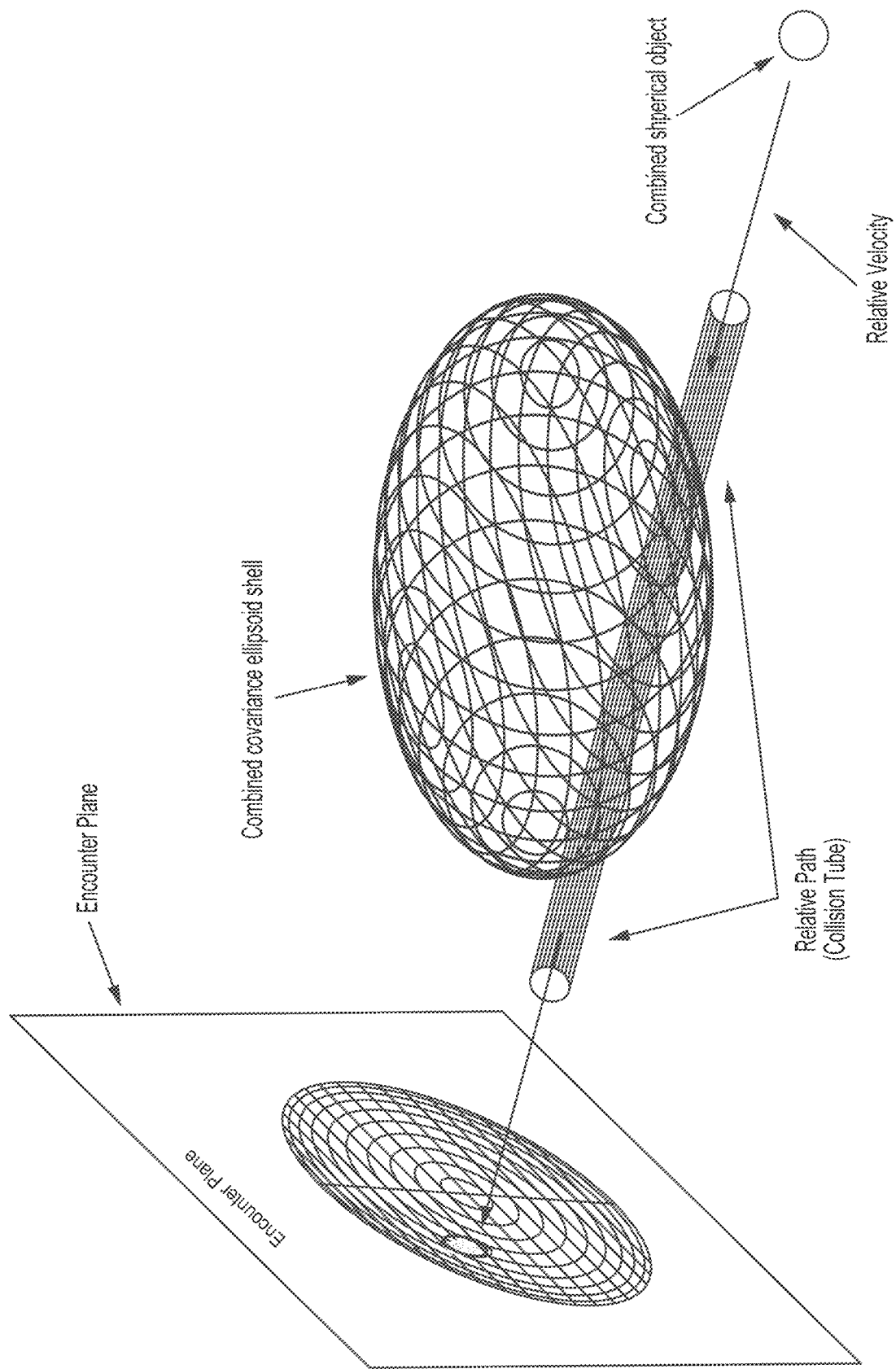
FIG. 3 is a block diagram illustrating a conjunction encounter.

Satellite positional errors are shown as error ellipsoids in FIG. 2. Because the covariances which describe these error ellipsoids are expected to be uncorrelated, they are simply summed to form a single combined covariance ellipsoid centered on the primary object's location. The secondary object passes quickly through this space creating a cylindrical path that is commonly called a collision tube. A physical overlap occurs if the secondary sphere comes within a distance equal to the sum of the two radii. Thus, a condition exists for collision. As shown in FIG. 3, the volume swept out by the combined spherical object is a cylinder passing through the combined covariance (represented pictorially as an ellipsoid shell) whose axis is aligned along the relative velocity vector.

Figure 4:
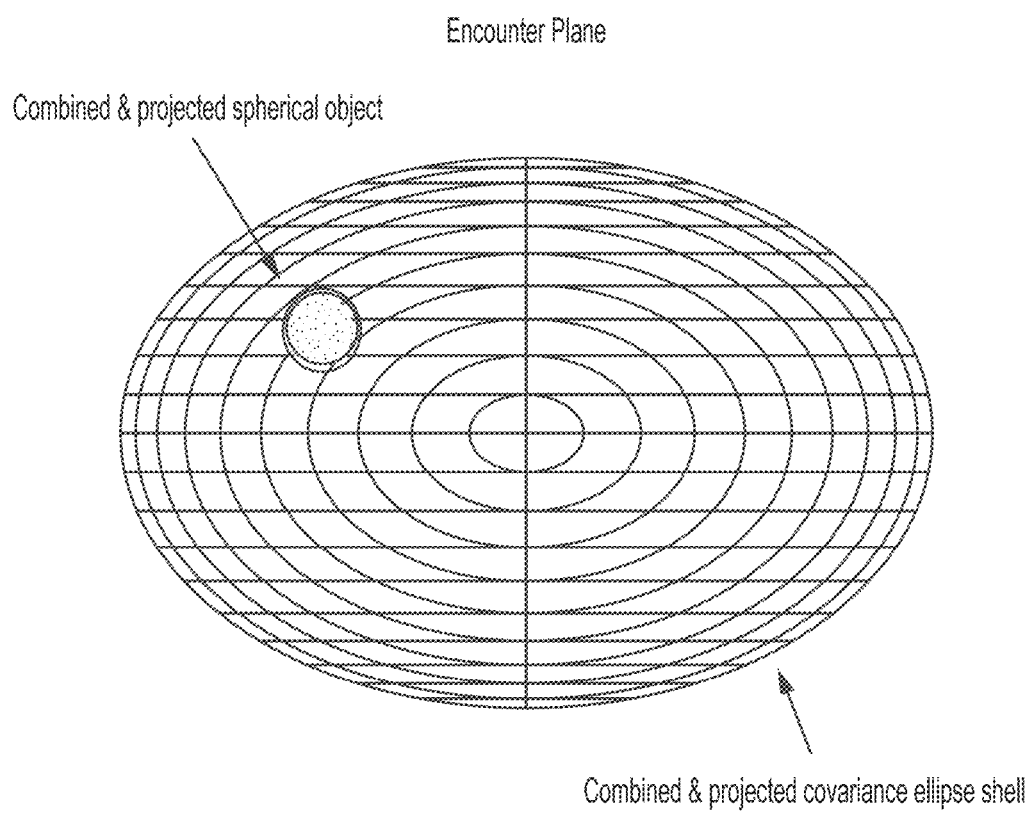
FIG. 4 is a block diagram illustrating combined covariance in the encounter plane.

$P_c$ is obtained by evaluating the integral of the three-dimensional probability density function (PDF) within the collision tube. Orbital bending effects reflected in the relative motion are typically negligible for high relative velocity conjunctions. This means the tube is straight, allowing the decoupling of the dimension associated with its path. Projecting the tube onto the encounter plane perpendicular to relative velocity produces a circle whose radius is the sum of the radii of the two spherical objects. The projected covariance ellipsoid becomes an ellipse as shown in FIG. 4. This representation allows us to reduce the computational dimensionality from three to two. $P_c$ is found by evaluating the integral of the resulting two-dimensional PDF within a circle on the encounter plane perpendicular to the relative velocity at the time of closest approach.

The resulting encounter plane's two-dimensional probability equation is given in Cartesian space as in Equation (1):

$$P_c(r, xm, ym, \sigma x, \sigma y) = \frac{1}{2\pi \sigma x \sigma y} \int_{-r}^{r} \int_{-\sqrt{r^2-x^2}}^{\sqrt{r^2-x^2}} e^{-\frac{1}{2}[(\frac{x-xm}{\sigma x})^2 + (\frac{y-ym}{\sigma y})^2]} dy\, dx \quad (1)$$

where r is the combined object radius, x lies along the covariance ellipse minor axis, y lies along the major axis, xm and ym are the respective components of the projected miss distance, and $\sigma x$ and $\sigma y$ are the corresponding standard deviations. There are numerous methods to evaluate this integral. The methodology that follows is not limited to any particular computational method.

While there are many reasons to use collision probability as a collision avoidance decision metric, it must be recognized that errors in the independent variables which Pc depends on can degrade or invalidate the estimated Pc result. Sensitivity of estimated actual collision probability to variations in such input data (object physical size, covariance size and covariance shape) are now explored.

Covariances generated from Orbit Determination (OD) processes are often unrealistic, requiring "scale factors" to properly reflect reality. This is especially true for OD systems that are either batch least squares-based or which do not properly account for error sources via Physically Connected Process Noise (PCPN) techniques. Flight experience, comparisons with positionally well-known reference orbits, and overlap (consistency) checks often indicate that the error covariances need to be "scaled" (occasionally smaller, but typically larger) to represent the actual errors in the state estimation. Such scaling is applied to the one-sigma eigenvectors corresponding to the inner ellipsoid 503 in FIG. 5, yielding the scaled ellipsoid in 502. Typically, a single scaling factor is consistently applied to all three eigenvector directions, but in principle each eigenvector could have its own scaling value. Such scale factors can help match the OD covariance with reality, and yet: 1) is scale factor applied to covariance at OD epoch and then propagated; 2) or is scale factor applied to covariance after propagation; 3) is it rigorous to scale covariance equally in all directions; 4) how does one know what scale factor to use for each Resident Space Object (RSO); and 5) is it rigorous to assume that the alignment (eigenvectors) of the scaled covariance are the same as the non-scaled one?

An alternative, and perhaps slightly more proper, approach is to insert "consider parameters" for unmodeled, or poorly modeled, forces such as drag, Solar Radiation Pressure (SRP), etc. While such consider parameters give the orbit analyst an additional degree of freedom to try to align the covariance with observed overlap, reference orbit or independent sensor metrics, consider parameters represent an assumed forcing function which may, or may not, be present. As such, they are only effective in the orbit regimes where such forces are present (i.e. drag consider parameters are probably not overly effective above 800 km or so, and SRP consider parameters are probably not meaningful in LEO). These reasons may explain the relatively large scale factors still required in GEO to bring Batch Least Squares covariances in line with independent "truth" measurements.

Figure 5:
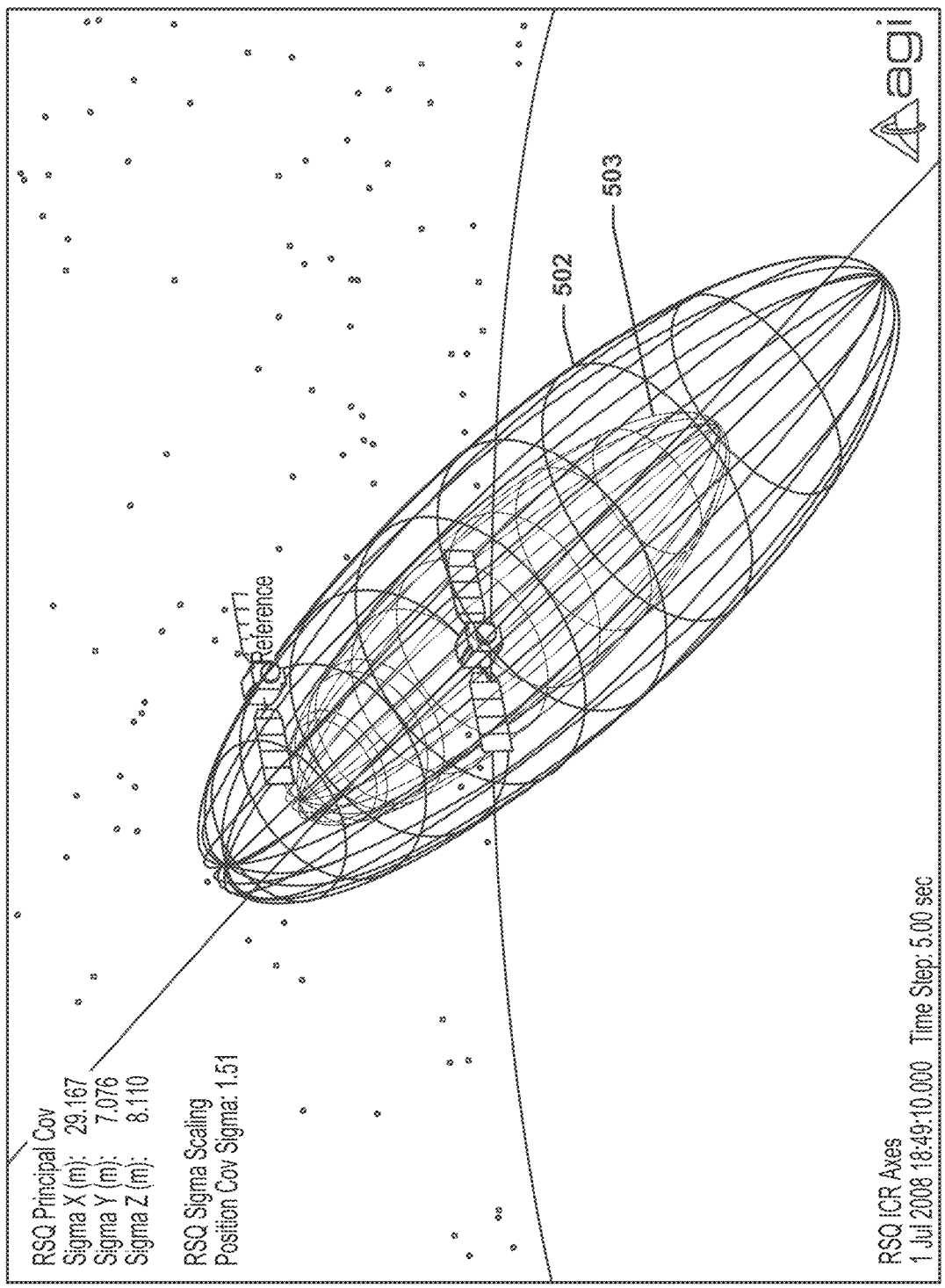
FIG. 5 is a block diagram of "sigma scaling" equally in all three dimensions.

As an example of covariance scaling using the fictitious conjunction case illustrated in FIG. 2, the ellipsoid corresponding to the combined error covariances for the two spacecraft is depicted as ellipsoid 503 in FIG. 5. A combination of reference orbit comparisons, statistical overlap tests and flight experience can be used to infer that the combined error ellipsoid must be scaled (occasionally smaller but typically larger) as depicted by the wireframe ellipsoid 502 shown in FIG. 5.

Figure 6:
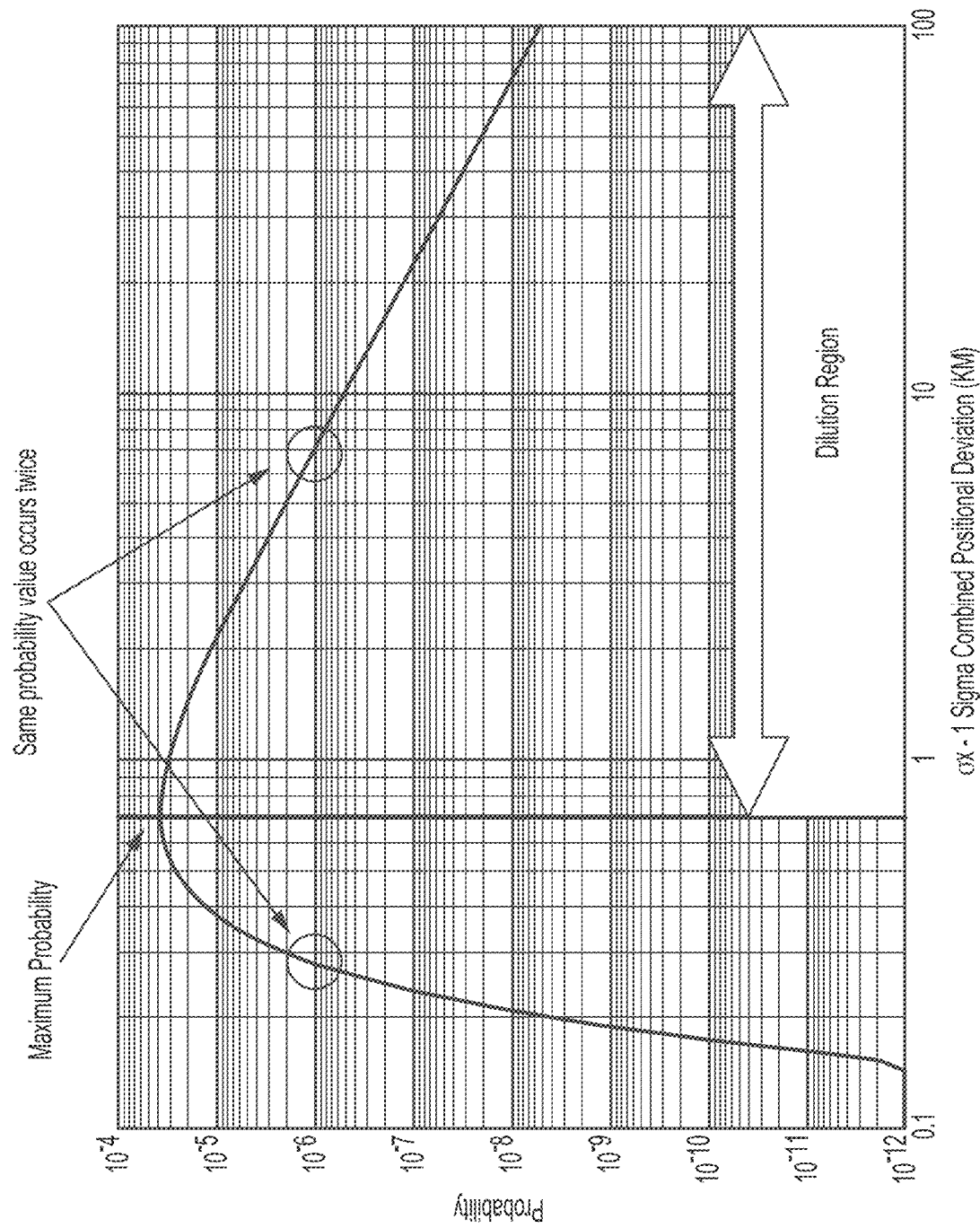
FIG. 6 is a graph of a dilution region defined for a notional encounter.

Variations in position covariance size can have a considerable effect on the probability calculation. The results of these variations are illustrated in FIG. 6, showing a nominal relationship for a sample case between $P_c$ and covariance size for a fixed Cartesian miss distance and fixed combined object radius. The scaled, combined covariance that produces the maximum probability ($P_{c_{max}}$) defines the dilution region boundary. To the left of this boundary (vertical line in FIG. 6), lesser positional uncertainty (smaller $\sigma$) decreases collision probability. To the right of the boundary, larger positional uncertainty (greater $\sigma$) also decreases collision probability. As shown, both small and large uncertainties can produce the same mathematically correct probability (1.e-6 is given as an example here). A very large uncertainty indicates little confidence in the predicted miss distance and will result in a low probability, deceptively implying that satellite safety increases as data quality decreases.

Such a characterization of the $P_c$ dependency on combined error covariance can be used to explore the $P_c$ sensitivity to the aggregate orbit solution quality at the Time of Closest Approach (TCA). A full understanding of this functional dependency is crucial to understanding, again for a fixed miss distance and combined object radius, how "good" (based on the combined covariance) the orbit solutions need to be to provide an actionable $P_c$ result.

For example, in the probability dilution region (right-hand side) in this sample case, note that an increase in a covariance's corresponding eigenvalues by one Order Of Magnitude (OOM) asymptotically reduces $P_c$ by 2 OOMs, and a factor of five eigenvalue increase maps to a $P_c$ decrease by a factor of fifty.

Outside the dilution region, increasing covariance by one OOM asymptotically increases $P_c$ by about four OOMs, and a factor of five increase yields an increase in $P_c$ by five thousand.

If the estimated actual probability was below an action threshold, the user could be led to conclude the encounter does not pose a worrisome threat. With great surety one can infer this when outside the dilution region provided, of course, the positional uncertainty is properly represented. This is because the low probability is coupled with great confidence in the predicted miss distance. Such would not be the case in the dilution region where there is little confidence in the predicted miss distance, yielding an unactionable result.

Faced with a low probability below an actionable threshold, one could use the dilution region boundary as a discriminator. If outside the dilution region then no remedial action is warranted. If inside the dilution region, rather than dismiss the conjunction as non-threatening, one should consider getting better (more current) data and re-evaluating $P_c$. This will help to ensure that a decision maker is not lulled into a false sense of security by a low probability calculation that may be specious.

A space object's physical size also plays an important role in the estimation of actual $P_c$. In a perfect world, such information would be supplied by satellite operators as a function of vehicle attitude and the vehicle's corresponding attitude flight rules. Typically such object size information is unavailable for operating spacecraft, and for debris it is almost always unavailable. Instead, object size is estimated from Radar Cross Section (RCS) measurements using a matched multi-modal/multi-regime radar-scattering cross-section-to-size model.

One such model is the Stanford Research Institute (SRI) RCS model, which assumes metallic conducting spheres with diameter d=2r to relate object detectability to object size. This simplified radar cross-section model models three regimes—the optical, Rayleigh, and Mie scattering regions—where the cross-sections are given by Equations (2), (3), and (4):

$$\sigma_{optical} = \pi r^2 \quad (2)$$

$$\sigma_{rayleigh} = \sigma_{optical} 64/9(\kappa r)^4 \quad (3)$$

$$\sigma_{mie} = \sigma_{optical}(1 \pm \sqrt{1.03(\kappa r)^{-5/2}})^2, \kappa r > 1 \quad (4)$$

Note that there is no attempt to model the detailed interference pattern in the Mie region; rather, the Mie cross-section defines the expected maximum and minimum cross section, and the region between the end of the Rayleigh regime and the start of the Mie region is obtained via interpolation.

To examine the accuracy of such an RCS-to-size estimation, four reference spheres of known size are selected, the POPACS, LARES, LARETS, and Stella orbiting reference spheres. Each of these reference spheres is of known size, with POPACS=10 cm, LARES=37.6 cm, LARETS=21 cm and Stella=24 cm radii, respectively.

Figure 7:
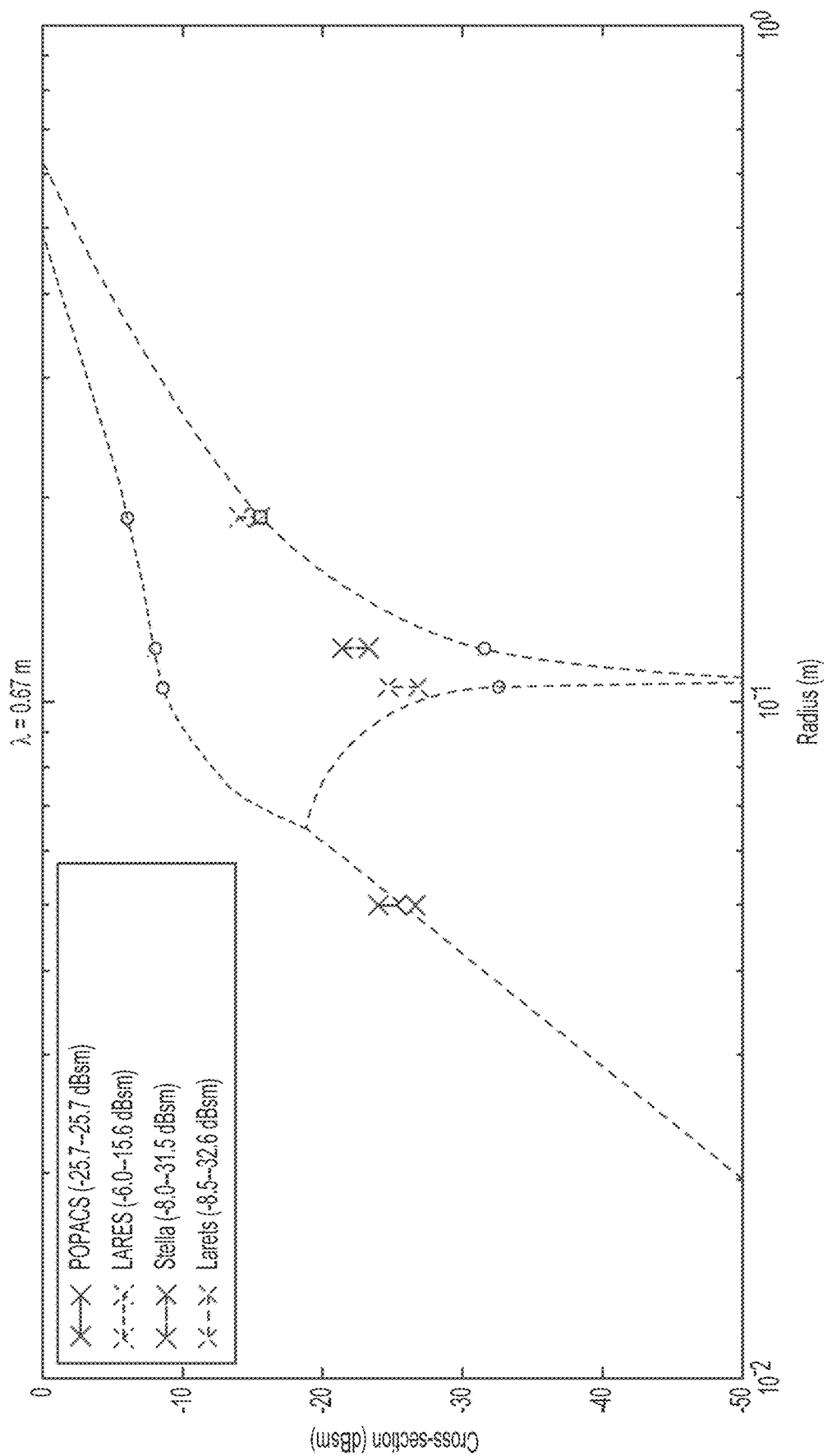
FIG. 7 is a graph showing measured and model-estimated RCS values for 4 orbiting reference spheres.

The RCS model's cross-section normalized to the optical cross-section as a function of normalized radius ($\kappa r$) is shown in FIG. 7. The RCS of each sphere was then measured by Poker Flat Incoherent Scatter Radar (PFISR). The vertical lines connecting the 'x' symbols show the range of measured RCS values obtained from PFISR, and the filled in circle symbols show the corresponding minimum and maximum predicted values using the SRI RCS model.

Figure 8A:
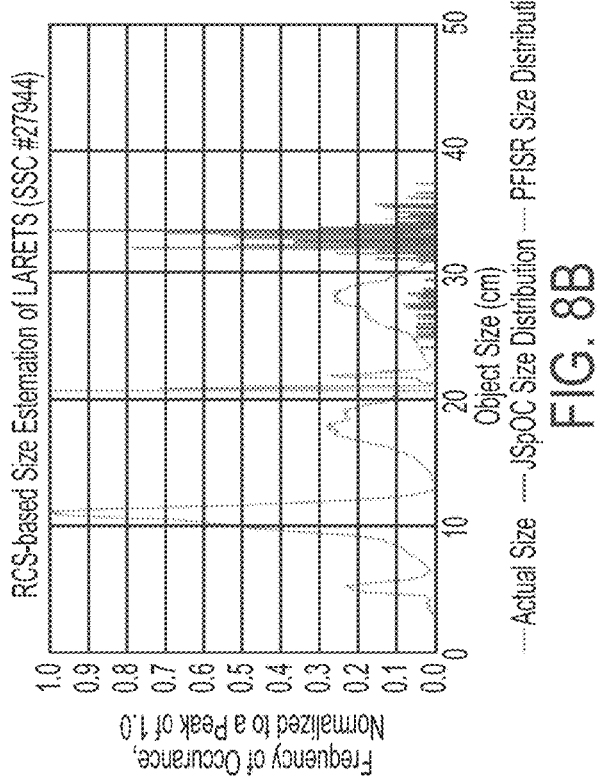
FIGS. 8A, 8B, 8C, and 8D show comparisons of object size estimates.
Figure 8B:
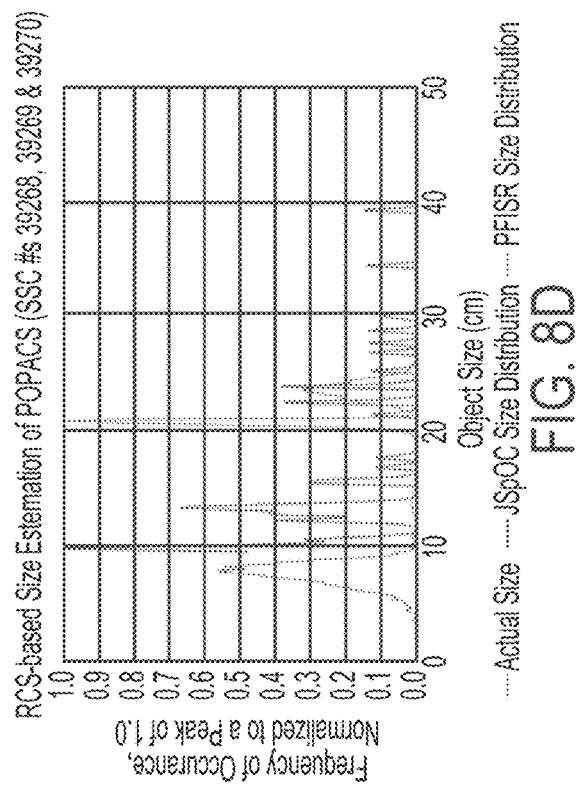
Figure 8C:
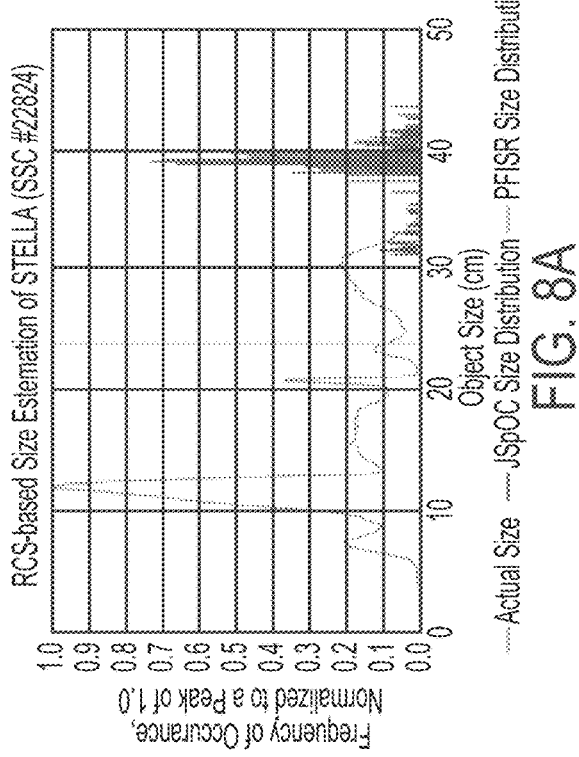
Figure 8D:
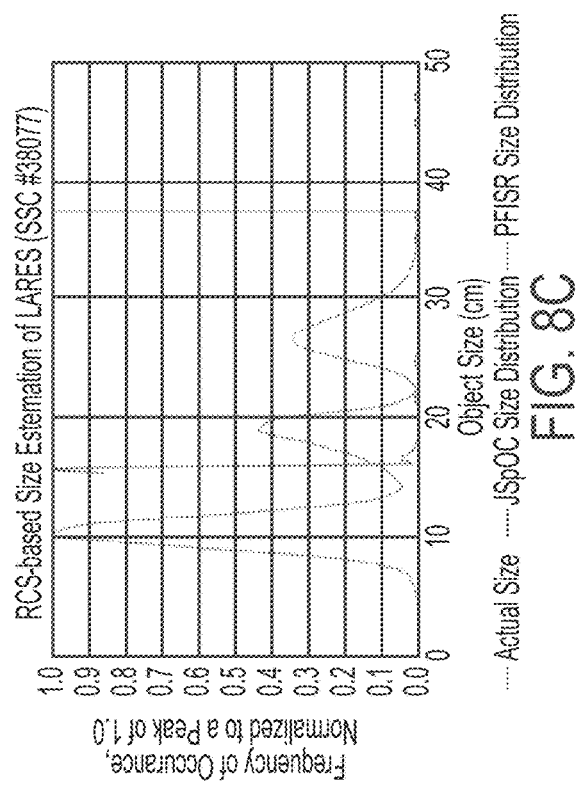

Next, the PFISR RCS measurements and the equivalent time history of Joint Space Operations Center (JSpOC)-calibrated RCS values were mapped to estimated physical size using the SRI RCS model and the NASA Size Estimation Model, respectively. These size estimates could then be compared to the known actual size of each reference sphere as shown in FIGS. 8A, 8B, 8C, and 8D. FIG. 8A is a comparison of STELLA size estimates derived from Commercial Space Operations Center (ComSpOC) and JSpOC RCS measurements. FIG. 8B is a comparison of LARETS size estimates derived from ComSpOC and JSpOC RCS measurements. FIG. 8C is a comparison of LARES size estimates derived from ComSpOC and JSpOC RCS measurements. FIG. 8D is a comparison of POPACS size estimates derived from ComSpOC and JSpOC RCS measurements. As the figures show, PFISR and JSpOC size estimates are of roughly comparable accuracy but both estimates (depending upon the radar regime assumed and viewing geometry or object asymmetry-based RCS variations) can easily be inaccurate by a factor of between 0.25 and 4.0

Figure 9:
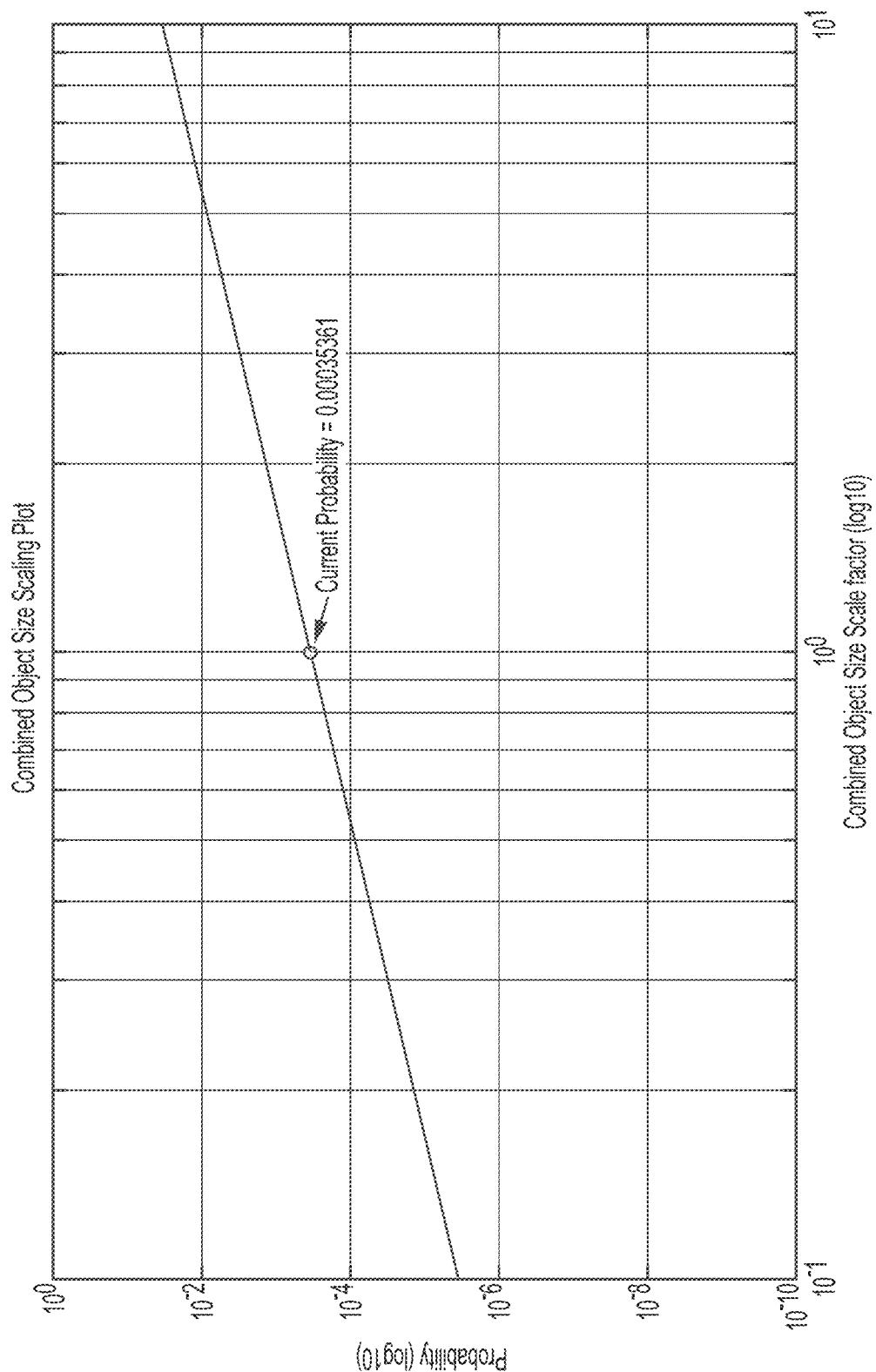
FIG. 9 is a graph of an example of probability versus object size.

How do such uncertainties in object size affect Pc estimates? The parametric evaluation of Equation 1 as shown in FIG. 9 indicates that increasing or decreasing the combined object radius by a factor of four increases or decreases the resulting Pc by a factor of sixteen. This "squaring" relationship is due to the fact that the combined object area in the encounter plane is $\pi r^2$. Conclusion: The use of accurate object size information is critical to the accurate estimation of collision probability.

A work-around to such inaccuracies in estimated object size is to simply assume a "nominal" value and then notify decision makers of that assumption. An example of this is the 20 m assumption used in some current Conjunction Data Message (CDM) screening processes. For the spheres analyzed here, such an assumption could result overestimation of combined object size by a factor of twenty. FIG. 9 indicates that such an object size error yields Pc values that can be several orders-of-magnitude off.

Figure 10:
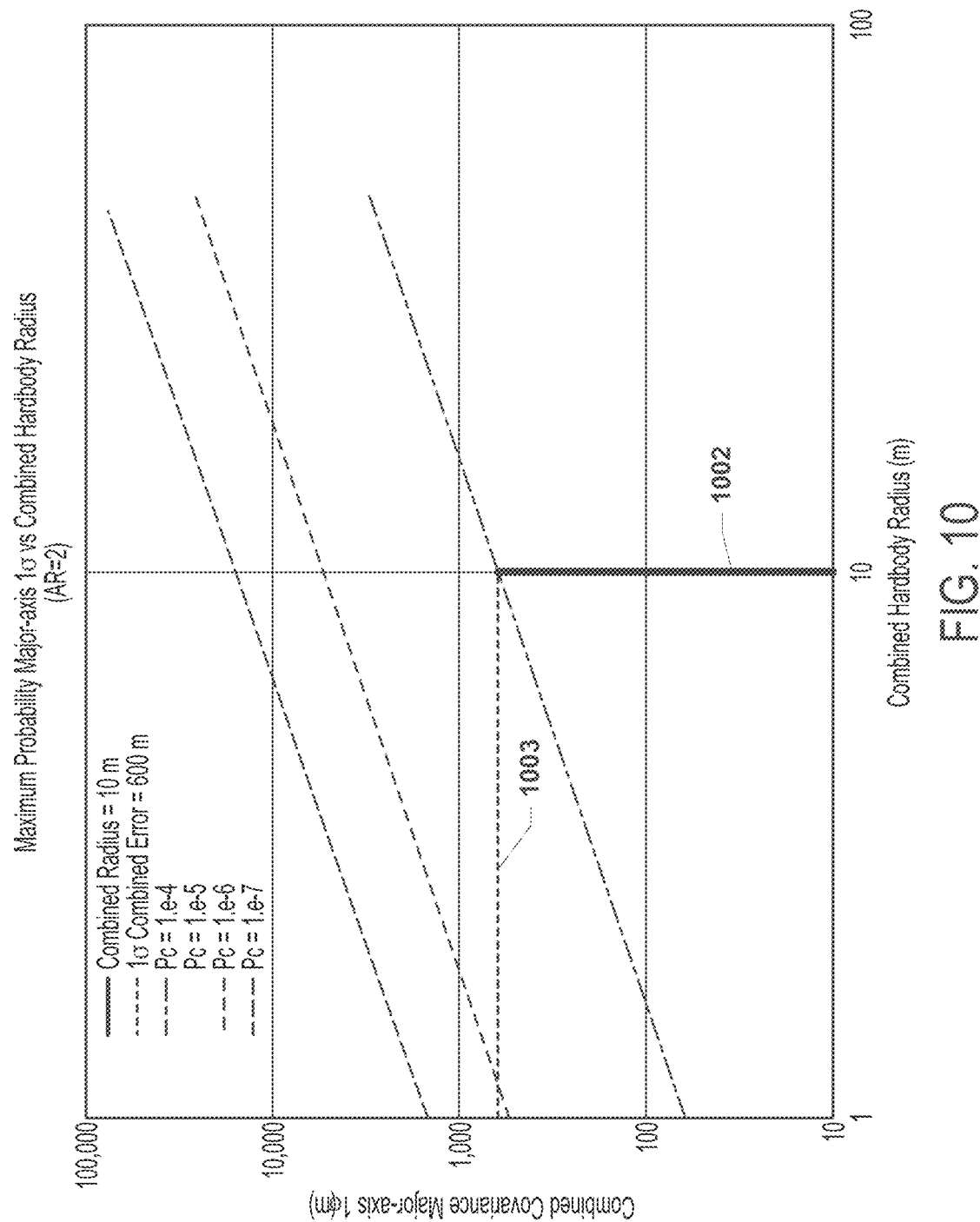
FIG. 10 is a graph of maximum probability as a function of object size and combined positional error.

The individual functional relationships in the above covariance realism and hardbody radius sections indicate a joint functional association between combined object size, combined positional error and maximum probability, as characterized in FIG. 10. This sample association assumes a combined covariance ellipsoid aspect ratio of 2.0 when projected on to the encounter plane; the association would be somewhat different for other aspect ratio values.

To use this figure, the user selects the combined hardbody radius of interest and the operator's desired Pc threshold. The intersection of the vertical line 1002 (hardbody radius) with the desired Pc threshold (e.g. a Pc of one in 10,000) yields (line 1003) a maximum allowable combined covariance major one-sigma eigenvalue of approximately 600 meters, or a three-sigma equivalent of 1.8 km. If one were to assume that both objects had equivalent contributing error covariances, then this indicates that each Resident Space Object (RSO) would need to have 1.8 km combined, $/\sqrt{2}$=1.273 km maximum three-sigma eigenvalue to EVER yield an estimated collision probability of the desired Pc threshold of one in 10,000.

Collision Probability Validity

Figure 11:
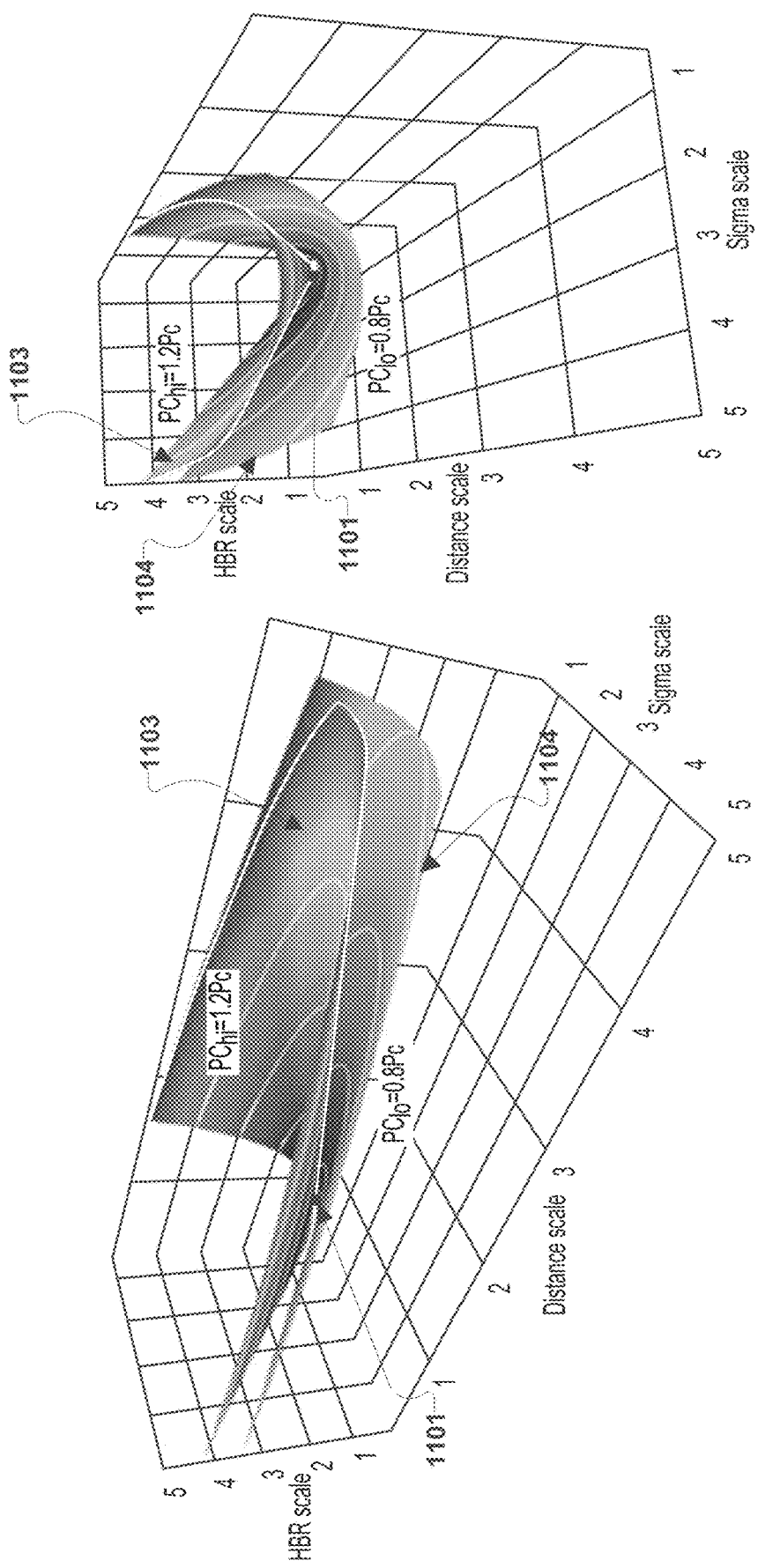
FIG. 11 illustrates an embodiment a three-dimensional topology illustrating a region of input parameter validity.
Figure 12:
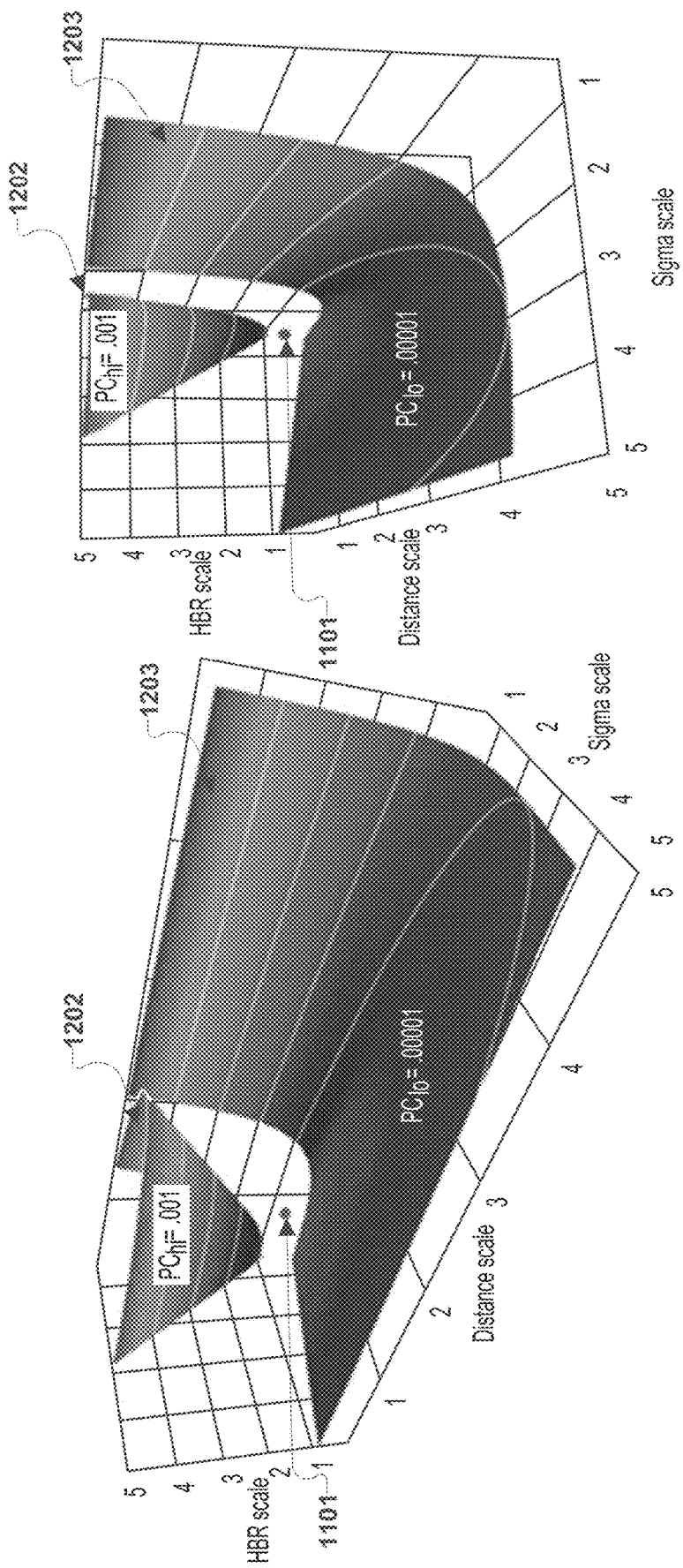
FIG. 12 illustrates an embodiment a three-dimensional topology illustrating a region of input parameter validity.
Figure 13:
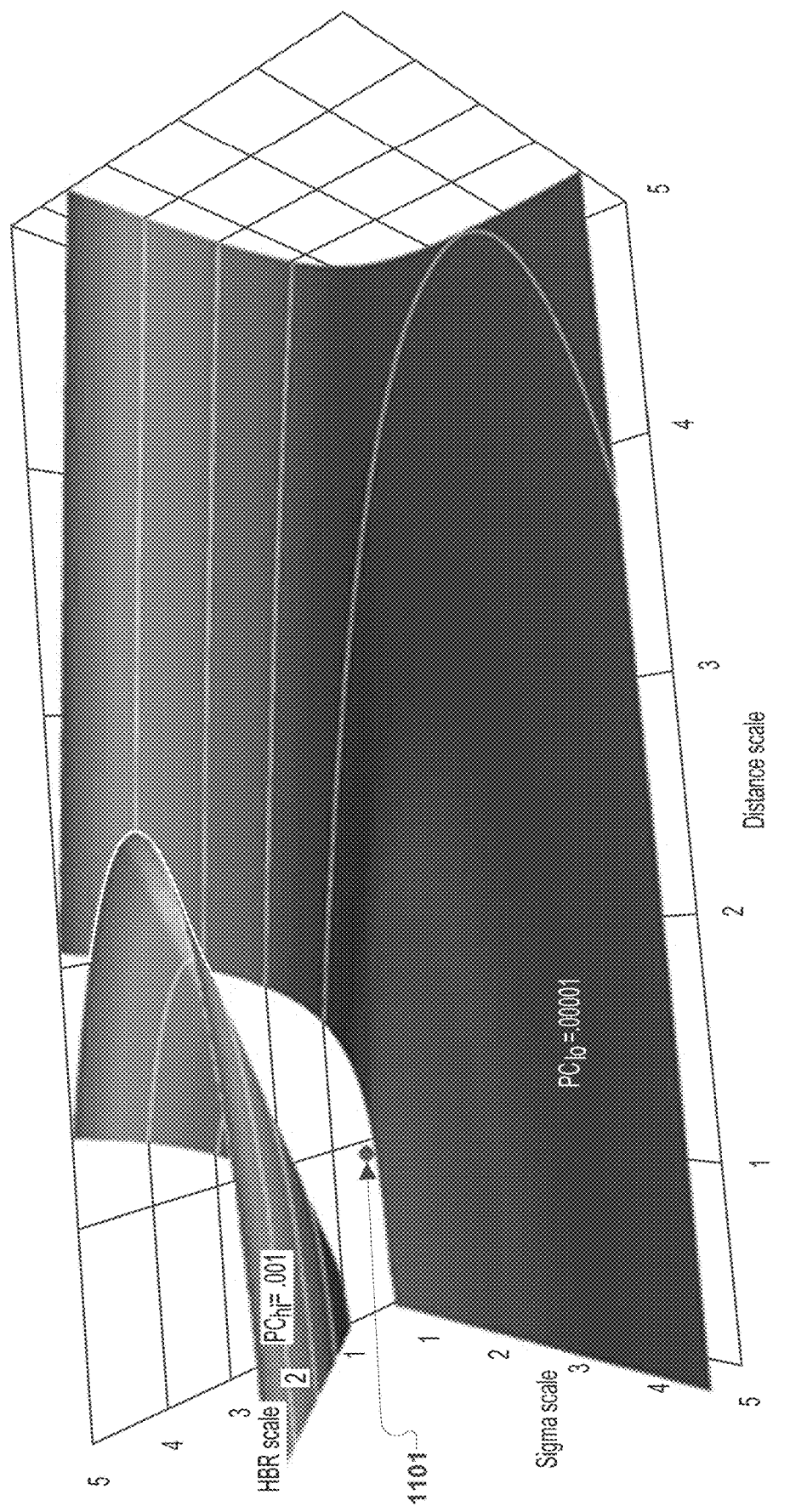
FIG. 13 illustrates an embodiment a three-dimensional topology illustrating a region of input parameter validity.

As discussed above, estimated actual collision probability is a function of, and sensitive to, variations in input data, namely object physical size (characterized as combined object hardbody radius r), covariance size, covariance aspect ratio (shape) and miss distance. It is therefore necessary to determine if this input data is of sufficient accuracy to be suitable for estimating collision probability for proper conjunction assessment (i.e. assess validity). Although Gaussian distributions were used for the topological depictions, any distribution can be used. FIGS. 11-13 illustrate aspects of embodiment GUIs that may depict, or otherwise visualize to users, probability of collision validation. FIGS. 11-13 illustrate aspects of embodiments GUIs that may display a three-dimensional interactive volume graph having an upper and lower bounding surface, the three-dimensional interactive volume graph generated from an upper and lower bound of probability of collision and reflecting all possible changes in object hardbody radius, covariance size, and miss distance that adhere to the upper and lower bounds of probability of collision. In various embodiment GUIs, the upper and lower bound of probability of collision may be a user adjustable threshold of interest above and below an estimated actual probability of collision.

The functional dependencies on object size and aspect ratio, as well as variations in r can be addressed by simply adopting a user-specified collision probability threshold and an allowable percentage error on the collision probability estimates and then portraying the volume containing all possible changes of object hardbody radius r in combination with changes in covariance size and miss distance which adhere to the adopted Pc threshold and percentage errors about that Pc threshold. In so doing, the variability due to inferring object sizes from radar cross sections or other estimation techniques can be seen as well.

Given an upper and lower bound of probability (e.g., within ±20% of the estimated actual Pc) and admissible, individual range scales for the combined object radius, covariance, and miss distance, upper and lower bounding surfaces can be created as shown in FIGS. 11, 12, and 13. FIGS. 11, 12, and 13 may be formed by an HTML script that invokes a three-dimensional surface plot. Once created, the viewer is enabled to interactively reorient the three-dimensional plot and/or zoom in/out using any browser. To generate FIGS. 11, 12, and 13 a single, random conjunction in Systems Tool Kit (STK) is simulated. The next step was to invoke STK's Advanced Conjunction Analysis Tools (AdvCAT) and then have a MATLAB program read in the data from its provider. This MATLAB program then varied s and C to create grid points through Equations 5 and 6 to generate the HTML file. Once created, STK and MATLAB were no longer needed. While STK and MATLAB are discussed in relation to FIGS. 11, 12, and 13, any conjunction analysis tool that can provide relative position and velocity vectors, associated uncertainty, and hard-body radius may be substituted for STK and any tool that can perform matrix algebra may be substituted for MATLAB and used to process the data and create the HTML file.

FIG. 11 depicts a single three-dimensional, interactive space, where all scales were set to plus/minus a factor of five (0.2-5.0) to examine all possibilities within 20% of the original probability. The small dot 1101 (visible toward the origin) represents the original data (no scaling). Acceptable combinations of object radius, covariance, and miss distance accuracy are encased by these upper 1103 and lower 1104 bounding surfaces. The two side by side views in FIG. 11 show the same single three-dimensional, interactive space, rotated in different orientations as a user might in an embodiment GUI (for example by dragging elements of the displayed three-dimensional space to rotate it) to examine different portions of the three-dimensional space.

These bounding surfaces 1103, 1104 are dependent upon the range of Pc action thresholds of interest. Whereas the above surfaces 1103, 1104 depict a 20% high (upper surface 1103) and 20% low errors (lower surface 1104) in Pc, one can instead select the lower boundary to correspond to the operator's adopted action threshold (e.g. 0.00001) and obtain the resulting boundaries 1202, 1203 as shown in FIG. 12. The lower contour 1203 reveals all the possible combinations of input accuracies which achieve that threshold.

The HTML, plot's interactive nature supports moving the cursor to reveal the scaling values of each axis on a given contour. Referring back to FIG. 12, the next figure (FIG. 13) shows that by holding covariance (x) and object size (z) to their original values and only scaling the distance (y) by a factor of 2.7, the threshold probability can be achieved. In an embodiment, an overlay in the GUI may show the name of the contour in addition to displaying the numerical values while also conveniently providing the corresponding reference lines to each of the three axes.

Although Gaussian distributions were used for the topological depictions, any distribution can be used.

Figure 14:
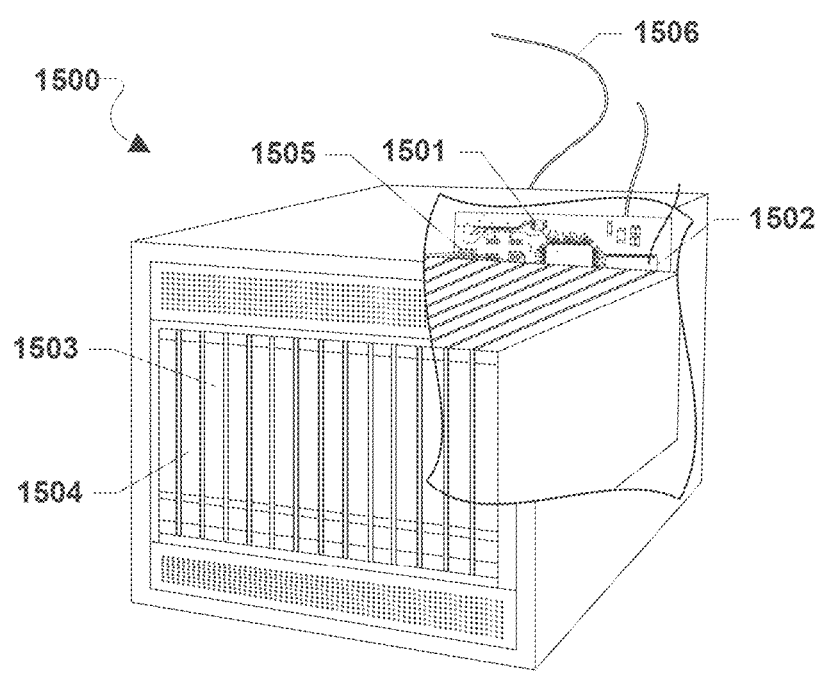
FIG. 14 is a component block diagram of a server suitable for use in the various embodiments.

The various embodiment methods may also be performed partially or completely on a server. Such embodiments may be implemented on any of a variety of commercially available server devices, such as the server 1500 illustrated in FIG. 14. Such a server 1500 typically includes a processor 1501 coupled to volatile memory 1502 and a large capacity nonvolatile memory, such as a disk drive 1503. The server 1500 may also include a floppy disc drive, compact disc (CD) or DVD disc drive 1504 coupled to the processor 1501. The server 1500 may also include network access ports 1505 coupled to the processor 1501 for establishing data connections with a network 1506, such as a local area network coupled to other broadcast system computers and servers. The processor 1501 may be any programmable microprocessor, microcomputer or multiple processor chip or chips that may be configured by software instructions (applications) to perform a variety of functions, including the functions of the various embodiments described above. Typically, software applications may be stored in the internal memory 1502, 1503 before they are accessed and loaded into the processor 1501. The processor 1501 may include internal memory sufficient to store the application software instructions.

Figure 15:
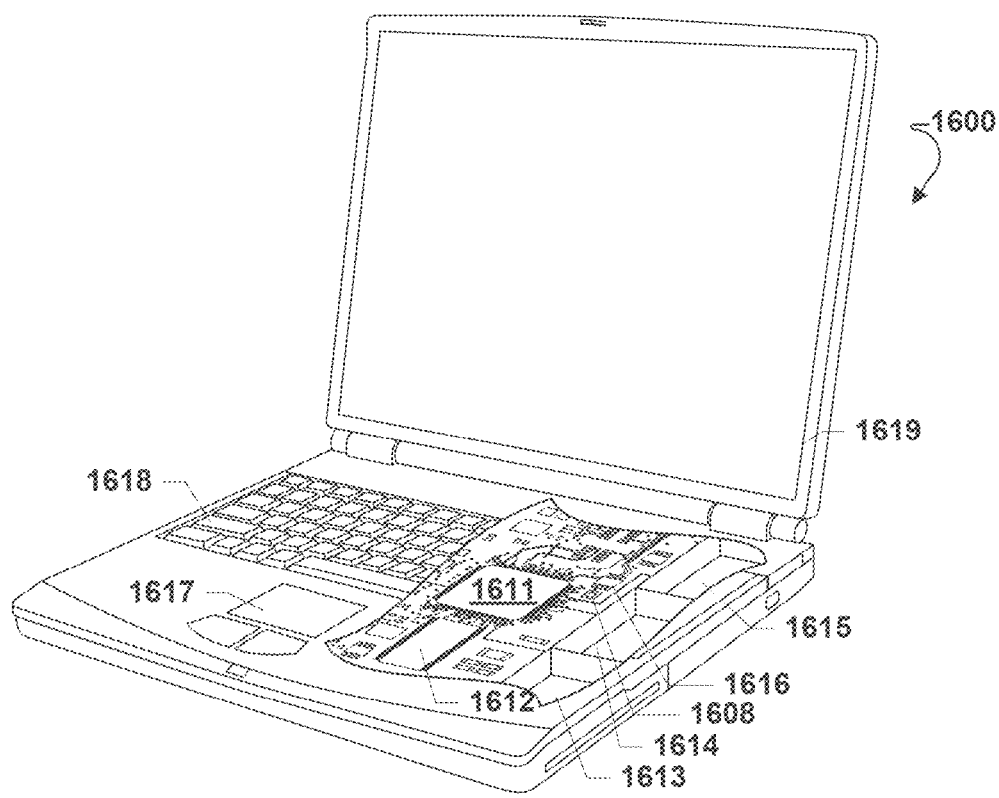
FIG. 15 is a component block diagram of a laptop that is a computing device suitable for use in the various embodiments.

The various embodiments described above may also be implemented within a variety of computing devices, such as a laptop computer 1600 illustrated in FIG. 15. Many laptop computers include a touchpad touch surface 1617 that serves as the computer's pointing device, and thus may receive drag, scroll, and flick gestures similar to those implemented on mobile computing devices equipped with a touch screen display and described above. A laptop computer 1600 will typically include a processor 1611 coupled to volatile memory 1612 and a large capacity nonvolatile memory, such as a disk drive 1613 of Flash memory. Additionally, the computer 1600 may have one or more antennas 1608 for sending and receiving electromagnetic radiation that may be connected to a wireless data link and/or cellular telephone transceiver 1616 coupled to the processor 1611. The computer 1600 may also include a floppy disc drive 1614 and a compact disc (CD) drive 1615 coupled to the processor 1611. In a notebook configuration, the computer housing includes the touchpad 1617, the keyboard 1618, and the display 1619 all coupled to the processor 1611. Other configurations of the mobile computing device may include a computer mouse or trackball coupled to the processor (e.g., via a USB input) as are well known, which may also be used in conjunction with the various embodiments.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

As used in this application, the terms "component," "module," "system," "engine," "generator," "unit," "manager" and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a multiprocessor, but, in the alternative, the processor may be any conventional processor, controller, microcontroller, or state machine. A processor may also be implemented as a combination of computing devices, e.g., a combination of a DSP and a multiprocessor, a plurality of multiprocessors, one or more multiprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for probability of collision validation in a satellite operations system, comprising:
   receiving, in a processor of a computing device of the satellite operations system, an upper and lower bound of probability of collision for a satellite or a space vehicle, wherein the upper and lower bound of probability of collision are a user adjustable threshold of interest above and below an estimated actual probability of collision;
   generating, by the processor, a three-dimensional interactive volume graph, the three-dimensional interactive volume graph generated from the upper and lower bound of probability of collision and reflecting changes in object hardbody radius, covariance size, and miss distance that adhere to the upper and lower bounds of probability of collision; and
   displaying, by the processor, the three-dimensional interactive volume graph having an upper and lower bounding surface distinct from one another and viewable in the three-dimensional interactive volume graph, wherein the three-dimensional interactive volume graph is rotated in different orientations based on user interaction with the three-dimensional interactive volume graph.

2. A computing device of a satellite operations system, comprising:
 a display; and
 a processor connected to the display, wherein the processor is configured with processor executable instructions to perform operations comprising:
receiving an upper and lower bound of probability of collision for a satellite or a space vehicle, wherein the upper and lower bound of probability of collision are a user adjustable threshold of interest above and below an estimated actual probability of collision;
generating a three-dimensional interactive volume graph, the three-dimensional interactive volume graph generated from the upper and lower bound of probability of collision and reflecting changes in object hardbody radius, covariance size, and miss distance that adhere to the upper and lower bounds of probability of collision; and
displaying the three-dimensional interactive volume graph having an upper and lower bounding surface distinct from one another and viewable in the three-dimensional interactive volume graph, wherein the three-dimensional interactive volume graph is rotated in different orientations based on user interaction with the three-dimensional interactive volume graph.

3. A satellite operations system, comprising:
 a computing device comprising a display screen, the computing device configured to:
receive an upper and lower bound of probability of collision for a satellite or a space vehicle, wherein the upper and lower bound of probability of collision are a user adjustable threshold of interest above and below an estimated actual probability of collision;
generate a three-dimensional interactive volume graph, the three-dimensional interactive volume graph generated from the upper and lower bound of probability of collision and reflecting changes in object hardbody radius, covariance size, and miss distance that adhere to the upper and lower bounds of probability of collision; and
display a graphical user interface on the display screen, wherein the graphical user interface displays the three-dimensional interactive volume graph having an upper and lower bounding surface distinct from one another and viewable in the three-dimensional interactive volume graph, and wherein the three-dimensional interactive volume graph is rotated in different orientations based on user interaction with the graphical user interface.

* * * * *